United States Patent
Kliger et al.

(10) Patent No.: US 9,479,621 B2
(45) Date of Patent: Oct. 25, 2016

(54) PHYSICAL LAYER (PHY) LINK SIGNALING FOR CABLE NETWORKS

(71) Applicant: Broadcom Corporation, Irvine, CA (US)

(72) Inventors: Avi Kliger, Ramat Gan (IL); Yitshak Ohana, Givat Zeev (IL); Niki Pantelias, Duluth, GA (US); Leo Montreuil, Atlanta, GA (US); Jonathan S. Min, Fullerton, CA (US); Edward Boyd, Petaluma, CA (US); Mark Laubach, Redwood City, CA (US); Victor Hou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/830,577

(22) Filed: Aug. 19, 2015

(65) Prior Publication Data

US 2015/0358437 A1  Dec. 10, 2015

Related U.S. Application Data

(63) Continuation of application No. 14/029,204, filed on Sep. 17, 2013, now Pat. No. 9,118,444.

(60) Provisional application No. 61/756,881, filed on Jan. 25, 2013, provisional application No. 61/752,532, (Continued)

(51) Int. Cl.
*H04B 1/38* (2015.01)
*H04L 29/08* (2006.01)

(Continued)

(52) U.S. Cl.
CPC ............ *H04L 69/323* (2013.01); *H04L 5/0046* (2013.01); *H04L 5/0057* (2013.01);

(Continued)

(58) Field of Classification Search
CPC .. H04L 69/323; H04L 5/0057; H04L 5/0046
USPC .......................................................... 375/222
See application file for complete search history.

(56) References Cited

U.S. PATENT DOCUMENTS

| 5,481,296 A | 1/1996 | Cragun et al. |
| 6,735,679 B1 * | 5/2004 | Herbst .................... H04L 12/46 711/167 |

(Continued)

FOREIGN PATENT DOCUMENTS

| EP | 2306782 | 4/2011 |
| WO | WO 2011/146840 | 11/2011 |

OTHER PUBLICATIONS

International Search Report with Written Opinion of the International Search Authority, Alexandria, Virginia, directed to related International Patent Application No. PCT/US2013/060094, mailed Mar. 5, 2014; 18 pages.

(Continued)

*Primary Examiner* — Don N Vo
(74) *Attorney, Agent, or Firm* — Sterne, Kessler, Goldstein & Fox PLLC

(57) ABSTRACT

Embodiments include systems and methods for enabling a physical layer (PHY) link signaling channel between a network termination modem and a cable modem in a cable network. The PHY link signaling channel is embedded within the same multi-carrier channel as the data and enables PHY link up between the network termination modem and cable modem without involvement of higher layers (e.g., MAC). The PHY link signaling channel can be implemented in the downstream (from the network termination modem to the cable modem(s)) or in the upstream from a cable modem to the network termination modem. Embodiments are applicable to any known cable network, and particularly to cable networks implementing the DOCSIS and EPoC standards.

20 Claims, 10 Drawing Sheets

Related U.S. Application Data filed on Jan. 15, 2013, provisional application No. 61/723,711, filed on Nov. 7, 2012, provisional application No. 61/702,170, filed on Sep. 17, 2012, provisional application No. 61/702,113, filed on Sep. 17, 2012, provisional application No. 61/702,102, filed on Sep. 17, 2012.

(51) Int. Cl.
- *H04L 5/00* (2006.01)
- *H04L 12/28* (2006.01)
- *H04L 27/26* (2006.01)
- *H04N 21/61* (2011.01)
- *H04N 21/426* (2011.01)

(52) U.S. Cl.
CPC ......... *H04L5/0094* (2013.01); *H04L 12/2861* (2013.01); *H04L 27/2602* (2013.01); *H04L 27/2627* (2013.01); *H04L 5/0092* (2013.01); *H04N 21/42676* (2013.01); *H04N 21/6118* (2013.01)

(56) References Cited

U.S. PATENT DOCUMENTS

| | | |
|---|---|---|
| 2003/0053484 A1 | 3/2003 | Sorenson et al. |
| 2003/0078060 A1 | 4/2003 | Becker et al. |
| 2004/0252725 A1 | 12/2004 | Sun et al. |
| 2006/0045002 A1 | 3/2006 | Lee |
| 2008/0186935 A1 | 8/2008 | Ling et al. |
| 2009/0279638 A1 | 11/2009 | Kurobe et al. |
| 2010/0080266 A1 | 4/2010 | Zhang et al. |
| 2010/0154017 A1 | 6/2010 | An et al. |
| 2010/0172434 A1 | 7/2010 | Chun et al. |
| 2010/0202334 A1 | 8/2010 | Soliman et al. |
| 2010/0214972 A1 | 8/2010 | Che et al. |
| 2011/0182383 A1 | 7/2011 | Ponnuswamy |
| 2012/0224659 A1 | 9/2012 | Yu et al. |
| 2012/0307842 A1 | 12/2012 | Petrov et al. |
| 2013/0235748 A1 | 9/2013 | Fong et al. |
| 2014/0079102 A1 | 3/2014 | Kliger et al. |

OTHER PUBLICATIONS

International Preliminary Report on Patentability directed to related International Patent Application No. PCT/US2013/060094, mailed Mar. 26, 2015; 2 pages.

"ITU-T Recommendation G. 9960 Unified high-speed wire-line based home networking transceivers—Foundation," *International Telecommunication Union*, retrieved from the Internet <www.itu.org>, posted on Mar. 2, 2010; 113 pages.

European Search Report directed to related European Application No. 13837570.4, mailed May 31, 2016; 5 pages.

\* cited by examiner

PHYSICAL LAYER (PHY) LINK SIGNALING FOR CABLE NETWORKS

CROSS-REFERENCE TO RELATED APPLICATION(S)

The present application is a continuation of pending U.S. application Ser. No. 14/029,204, filed on Sep. 17, 2013, which claims the benefit of U.S. Provisional Application No. 61/702,102, filed Sep. 17, 2012, U.S. Provisional Application No. 61/702,113, filed Sep. 17, 2012, U.S. Provisional Application No. 61/702,170, filed Sep. 17, 2012, U.S. Provisional Application No. 61/723,711, filed Nov. 7, 2012, U.S. Provisional Application No. 61/752,532, filed Jan. 15, 2013, and U.S. Provisional Application No. 61/756,881, filed Jan. 25, 2013, all of which are incorporated herein by reference in their entireties.

TECHNICAL FIELD

The present disclosure relates generally to physical layer (PHY) link signaling in cable networks.

BACKGROUND

Background Art

In cable networks, before upper layer (e.g., Medium Access Control (MAC)) information can flow between two nodes (e.g., network termination modem and cable modem), a physical layer (PHY) link needs to be established. Typically, establishing the PHY link requires the cable modem to determine the frequency location of the physical channel, determine physical transmission characteristics of the channel, and synchronize itself in time/frequency with the network termination modem.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
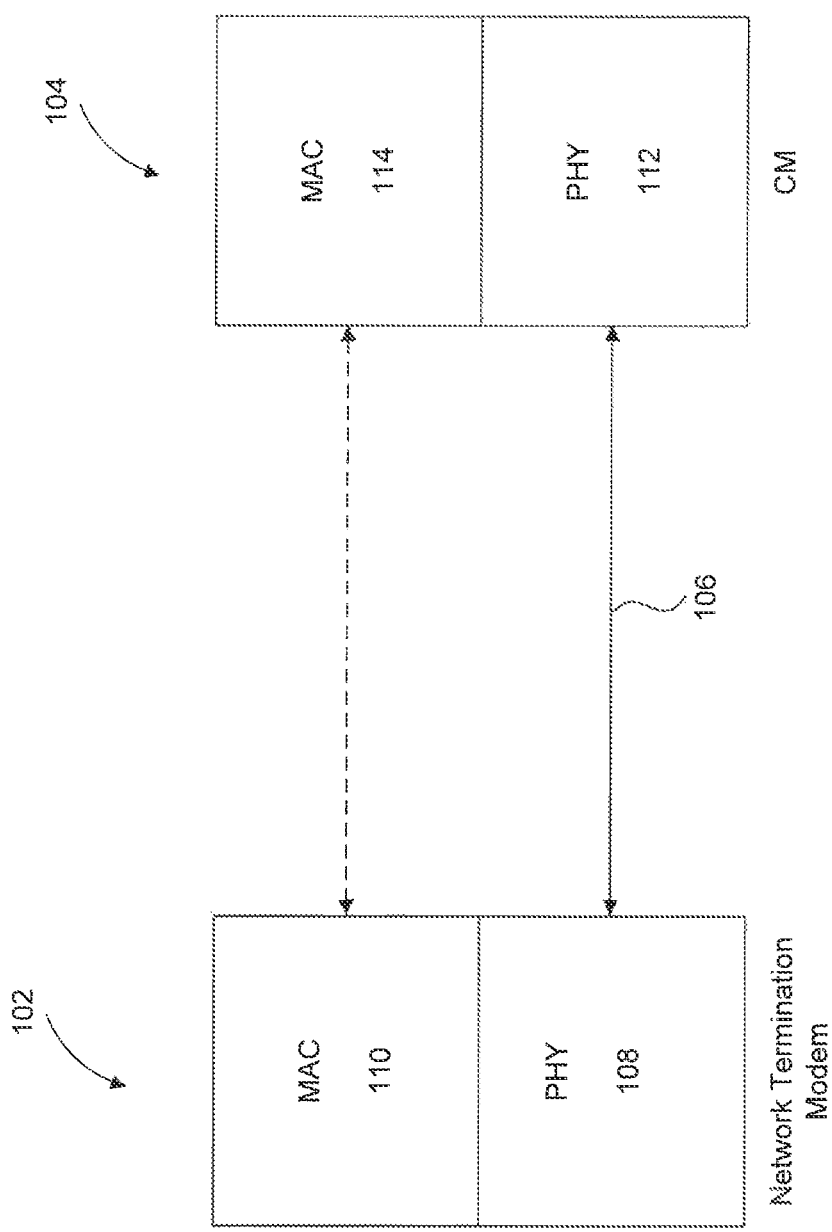
FIG. 1 illustrates an example cable network architecture according to an embodiment.

FIG. 1 illustrates an example cable network architecture 100 according to an embodiment. Example cable network architecture 100 is provided for the purpose of illustration only and is not limiting of embodiments. Embodiments described herein can be implemented in a cable network architecture, such as cable network architecture 100.

As shown in FIG. 1, example network architecture 100 includes a network termination modem 102 and a cable modem 104, coupled via a distribution network 106. Distribution network 106 can include a coaxial cable and optionally other coaxial components (e.g., splitters, amplifiers, etc.). As would be understood by a person of skill in the art based on the teachings herein, network termination modem 102 can serve multiple cable modems, such as cable modem (CM) 104, in a point-to-multipoint topology. According to embodiments, network termination modem 102 can be a Data Over Cable Service Interface Specification (DOCSIS) Cable Modem Termination System (CMTS) or a Coaxial Line Terminal (CLT), for example. CM 104 can be a DOCSIS cable modem or a Coaxial Network Unit (CNU), for example.

Network termination modem 102 and CM 104 implement respective Medium Access Control (MAC) layers 110 and 114. According to embodiments, MAC layers 110 and 114 can be, without limitation, DOCSIS or Ethernet Passive Optical Network (EPON) MAC layers. An end-to-end MAC link can be established between MAC layers 110 and 114 as shown in FIG. 1.

Network termination modem 102 and CM 104 implement physical layers (PHYs) 108 and 112 respectively. PHYs 108 and 112 establish a PHY link over distribution network 106, which can be transparent to upper layers such as the MAC layer. PHYs 108 and 112, can be, without limitation, DOCSIS PHYs or Ethernet Passive Optical Network over Coax (EPoC) PHYs. In an embodiment, PHY 108 includes a service provider PHY and PHY 112 includes a subscriber PHY.

Figure 2:
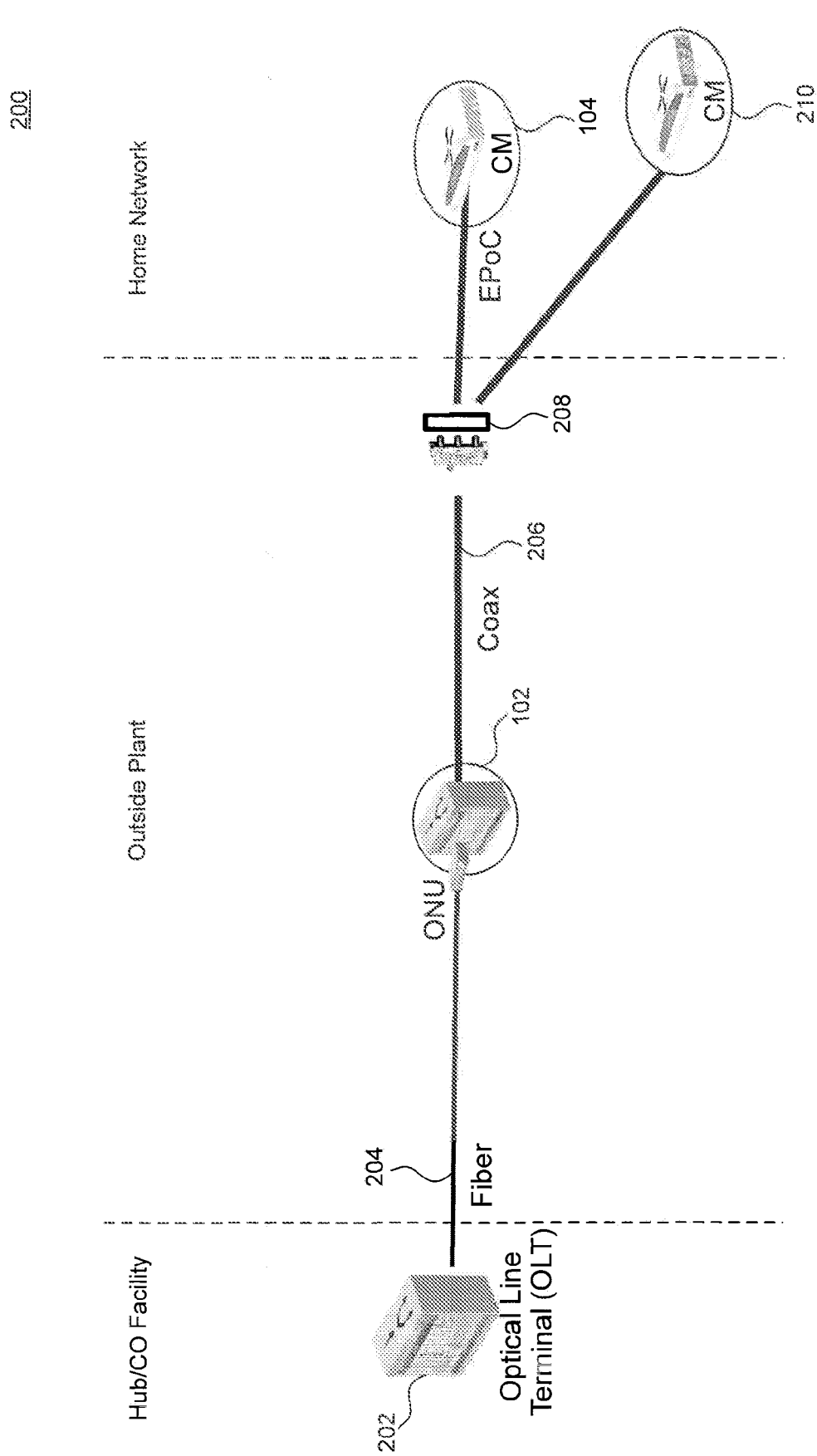
FIG. 2 illustrates another example cable network architecture according to an embodiment.

FIG. 2 illustrates another example cable network architecture 200 according to an embodiment. Example cable network architecture 200 is provided for the purpose of illustration only and is not limiting of embodiments. Embodiments described herein can be implemented in a cable network architecture, such as cable network architecture 200. Cable network architecture 200 is a hybrid fiber coaxial (HFC) architecture.

As shown in FIG. 2, example cable network architecture 200 includes an Optical Line Terminal (OLT) 202, which is coupled via a fiber optic line 204, to network termination modem 102. Network termination modem 102 includes an Optical Network. Unit (GNU) that allows it to establish an EPON MAC link over fiber optic line 204 with OLT 202. Network termination modem 102 is coupled via a coaxial cable 206, and an intervening splitter 208, to CM 104 and a CM 210. Accordingly, network termination modem 102 acts as a bridge between the optical and the coaxial portions of the network. In an embodiment, network termination modem 102 includes a media converter for converting signals at the PHY level from optical to electrical, and vice versa.

In either one of example cable network architectures 100 and 200, PHYs 108 and 112 of network termination modem 102 and CM 104 need to establish a PHY link before any upper layer (e.g., MAC layer) data can flow between network termination modem 102 and CM 104. Establishing the PHY link includes, among others, CM 104 determining the location in frequency of the upstream/downstream channel, determining the physical transmission characteristics of the channel (e.g., transmit power level, modulation order, symbol time, cyclic prefix (CP) size, Forward Error Correction (ITC) type, etc.), and establishing time/frequency synchronization with network termination modem 102.

Conventionally, the channel characteristics may be fixed and known to CM 104 such that CM 104 can establish the PHY link without assistance from network termination modem 102. However, in future cable networks (e.g., DOCSIS 3.1 and EPoC), it is envisioned that cable operators will be able to configure the channel as desired both in terms of its location in frequency (can include multiple adjacent or non-adjacent bands in the upstream or downstream) and its physical transmission characteristics. In addition, it is also anticipated that the channel can have variable physical transmission characteristics (e.g., modulation profiles, transmit power, etc.) over time (e.g., from one symbol to another) and frequency (e.g., from subcarrier to subcarrier). Accordingly, CM(s) wishing to connect to network termination modern 102 require assistance from network termination modem 102 in order to establish PHY links to CLT 102.

Embodiments as further described below include systems and methods for enabling a PHY link signaling channel between a network termination modem and a CM in a cable network. The PHY link signaling channel is embedded within the same multi carrier channel as the data and enables PHY link up between the network termination modem and CM without involvement of higher layers (e.g., MAC). The PHY link signaling channel can be implemented in the downstream (from the network termination modem to the CM(s)) or in the upstream from a CM to the network termination modem. Embodiments are applicable to any known cable network, and particularly to cable networks implementing the DOCSIS and EPoC standards.

Figure 3:
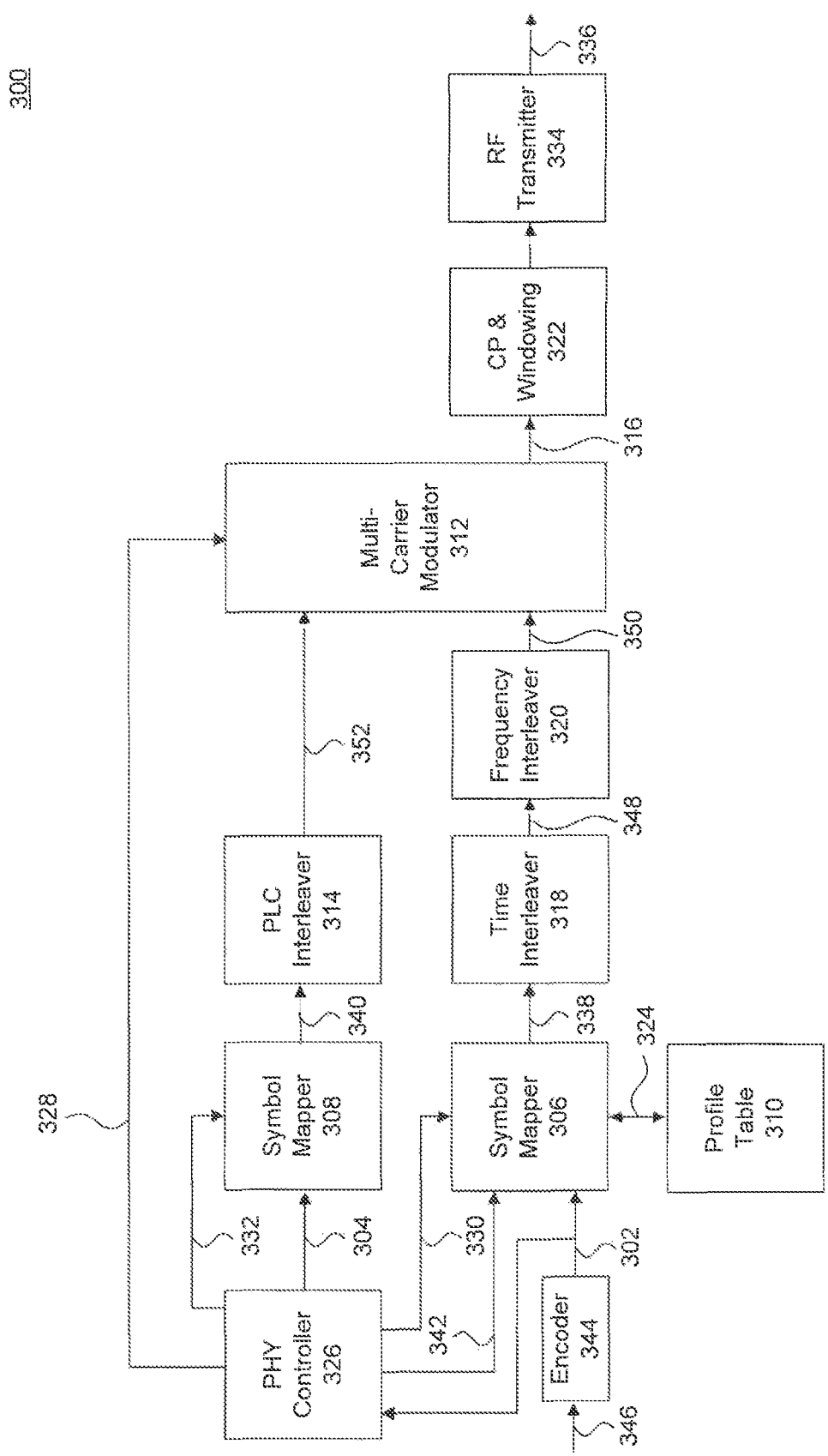
FIG. 3 illustrates an example physical layer (PHY) transmitter according to an embodiment.

FIG. 3 illustrates an example physical layer (PHY) transmitter 300 according to an embodiment. Example PHY transmitter 300 is provided for the purpose of illustration only and is not limiting of embodiments. Example PHY transmitter 300 can be located in a network termination modem, such as network termination modem 102, for example, or in a CM, such as CM 104. In the embodiment described below, PHY transmitter 300 is described as being embedded in a network termination modem and used to generate and transmit a multi-carrier modulated signal (comprising time consecutive multi-carrier modulated symbols, each symbol transmitted in a symbol time slot over a multi-carrier channel), carrying both data and PHY link signaling, downstream to at least one CM. As will be understood by a person of skill in the art based on the teachings herein, PHY transmitter 300 can also be used in a CM to generate and transmit a multi-carrier modulated signal for carrying data and PHY link signal upstream to the network termination modem. For the purpose of simplification only, the discussion below describes the generation and transmission of a single multi-carrier modulated symbol in a particular symbol time slot. The multi-carrier modulated symbol can be an Orthogonal Frequency Division Multiplexing (OFDM) or an Orthogonal Frequency Division Multiple Access (OFDMA) symbol, for example.

As shown in FIG. 3, example PHY transmitter 300 includes, among other components, an encoder 344; a PHY controller 326; symbol mappers 306 and 308; a profile table 310; a PHY Link Channel (PLC) interleaver 314; a time interleaver 318; a frequency interleaver 320, a multi-carrier modulator 312, which may include an inverse Fast Fourier Transform (IFFT) module; a Cyclic Prefix (CP) and Windowing module 322; and a Radio Frequency (RF) transmitter 334. Example PHY transmitter 300 can be coupled to a coaxial cable 336.

In an embodiment, PHY transmitter 300 is configured to receive a bit stream 346 from a MAC layer. Bit stream 346 is divided into blocks that are encoded (e.g., Forward Error Correction (FEC) encoded) using encoder 344 to generate MAC data bit stream 302. MAC data bit stream 302 includes a plurality of consecutive data codewords, each of which may be destined to one or more CM. In an embodiment, a modulation profile is associated with each codeword depending on the CM(s) to which the codeword is destined. In an embodiment, MAC data bit stream 302 is received by both symbol mapper 306 and PHY controller 326.

In an embodiment, PHY controller 326 determines the modulation profile for each codeword contained in MAC data bit stream 302. PHY controller 326 then configures symbol mapper 306 for the codeword using a control signal 330. Based on signal 330, symbol mapper 306 retrieves the appropriate modulation profile for the codeword from profile table 310 and maps the codeword, based on the modulation profile, to respective constellation points to generate data symbols 338. In an embodiment, the modulation profile for the codeword determines a symbol bit loading per subcarrier for the codeword, which determines a number of bits per second per Hz that can be loaded into a subcarrier in a symbol time slot. In other words, the modulation profile for the codeword determines the number of subcarriers needed to transmit the codeword in a symbol time slot. For example, in the case of OFDM, each subcarrier of the OFDM symbol can be independently modulated using a Quadrature Amplitude Modulation (QAM) constellation from 1 bit per second per Hz (Binary Phase Shift Keying) up to 12 bits per second per Hz (QAM-4096). Data symbols 338 are then provided to time interleaver 318, which performs time interleaving on data symbols 338 to generate time-interleaved data symbols 348, and then to frequency interleaver 320, which performs frequency interleaving on time-interleaved data symbols 348 to generate time and frequency interleaved data symbols 350. Data symbols 350 are then provided to multi-carrier modulator 312.

In an embodiment, PHY controller 326 is further configured to generate a PHY link signaling bit stream 304. In an embodiment, PHY link signaling bit stream 304 includes bits (which may also form codewords if FEC protection is applied to the PHY link signaling) for a PHY Link Channel (PLC). As further described below, the PLC can be transmitted on dedicated subcarriers (e.g., 8, 16, 32) and contains PHY link up information for CM(s) wishing to connect to the network termination modem. For example, the PHY link up information can include a template of a multi-carrier channel being transmitted from the network termination modem. The multi-carrier channel, as described below, can include data and the PLC. The template of the multi-carrier channel can include, without limitation, at least one of: a center frequency of the multi-carrier channel, available subcarriers of the multi-carrier channel, frequency locations of NPP subcarriers (described below) within the multi-carrier channel, a default modulation profile, synchronization information, and power management information. In an embodiment, messages contained in the PLC can span more than one symbol time slot.

In another embodiment, the PLC can include a preamble, which can be used by the CM(s) to locate the PLC in frequency. The preamble can include a pre-determined sequence, e.g., a pseudorandom noise (PN) sequence, which can be used by a CM to detect the PLC.

In another embodiment, the PLC can include a power management message. The power management can indicate that data codewords of a specific profile (e.g., profile A') will be transmitted on the data channel. In an embodiment, profile A' codewords are intended for one or more CMs in sleep mode. Profile A' codewords can include unicast or broadcast user data packets and/or unicast MAC Management Messages (MMM). In an embodiment, CMs in sleep mode continue to monitor the PLC and upon seeing the power management message wake up in advance of transmission of profile A' to receive the profile A' codewords on the data channel. In another embodiment the CMs wake up to listen for power management messages carried over the PLC, e.g., when to wake up and into which power management mode.

In an embodiment, symbol mapper 308 is configured to receive PHY link signaling bit stream 304 from PHY controller 326 and to map PHY link signaling bit stream 304 to respective constellation points to generate PLC symbols 340. In an embodiment, the QAM modulation used by symbol mapper 308 is provided by PHY controller 326 using a control signal 332 and can vary depending on the number of subcarriers dedicated for transporting the PLC. In another embodiment, symbol mapper 308 uses 16-QAM (4 bits per symbol) in mapping PHY link signaling bit stream 304. PLC symbols 340 are then provided to PLC interleaver 314, which performs time interleaving on PLC symbols 340 to generate time interleaved PLC symbols 352. PLC symbols 352 are then provided to multi-carrier modulator 312 for modulation onto respective dedicated subcarriers.

In another embodiment, PHY controller 326 is further configured to generate and provide a Next Profile Pointer (NPP) channel bit stream 342 to symbol mapper 306. As further described below, the NPP channel can be transmitted on dedicated data subcarriers (NPP subcarriers) that are a subset of available subcarriers in a given symbol time slot. In an embodiment, the NPP channel is composed of NPP messages, each occupying one symbol time slot. The NPP message contains pointers, which identify the frequency boundaries (e.g., end subcarriers), and modulation profile identifiers, which identify the modulation profiles of data codewords (or groups of data codewords) being transported during the same symbol time slot as the NPP message. Thus, the contents of NPP channel bit stream 342 sequentially correspond to the data codewords contained in MAC data bit stream 302. In one embodiment, pointers of the NPP message point to every data codeword being transported during the same symbol time slot as the NPP message. In another embodiment, pointers of the NPP message point to a group of data codewords with a similar profile, being transported during the same symbol time slot as the NPP message.

In another embodiment, PHY controller 326 provides NPP channel bit stream 342 to symbol mapper 308. The NPP channel can then be processed along with the PLC channel in symbol mapper 308 and then multi-carrier modulator 312. For the purpose of simplification, only the embodiment in which the NPP channel is processed along with the data in symbol mapper 306 and then time interleaver 318, frequency interleaver 320, and multi-carrier modulator 312 is described herein. Processing of the NPP channel using symbol mapper 308, PLC interleaver 314, and then multi-carrier modulator 312 should be apparent to a person of skill in the art based on the teachings herein.

Symbol mapper 306 is configured to map NPP channel bit stream 342 to respective constellation points to generate NPP symbols. In FIG. 3, the NPP symbols are assumed to form a part of data symbols 338. In an embodiment, the QAM modulation used by symbol mapper 306 is provided by PHY controller 326 using control signal 330 and can vary depending on the number of subcarriers dedicated for transporting the NPP channel and/or the estimated Signal to Noise Ratio (SNR) of the subcarriers dedicated for transporting the NPP channel. In another embodiment, symbol mapper 306 uses a fixed constellation of 64-QAM (6 bits per subcarrier) or 16-QAM (4 bits per subcarrier) or QPSK (2 bits per subcarrier) in mapping NPP channel bit stream 342.

In an embodiment, symbol mapper 306 receives MAC data bit stream 302 and NPP channel bit stream 342 in parallel and processes the two bit streams in a synchronized manner so that as each data codeword of MAC data bit stream 302 is mapped to respective data symbols, its corresponding bits (e.g., the bits that describe the codeword's frequency boundary and modulation profile identifier) of NPP channel bit stream 342 are respectively mapped to NPP symbols. The mapping of a data codeword and its corresponding NPP channel bits can occur at the same time or one after the other. In another embodiment, the processing of MAC data bit stream 302 and NPP channel bit stream 342 by symbol mapper 306 occurs at the direction of PHY controller 326. Symbol mapper 306 then provides data (and NPP) symbols 338 to time interleaver 318. The same processing occurs as described above in time interleaver 318 and frequency interleaver 320.

Multi-carrier modulator 312 is configured to modulate data (and NPP) symbols 350 and PLC symbols 352 with data subcarriers and PLC subcarriers respectively to generate a multi-carrier modulated symbol 316. Multi-carrier modulated symbol 316 can be an OFDM symbol, for example.

In an embodiment, each data or NPP symbol is modulated with respective subcarriers, and each PLC symbol is modulated with respective subcarriers. In an embodiment, each pointer and corresponding modulation profile identifier (which are associated with the same codeword) of an NPP message are mapped to a single subcarrier. However, in other embodiments, more than one subcarrier can be used. Data (and NPP) symbols 350 can be modulated with a contiguous (frequency adjacent) or non-contiguous collection of data subcarriers. The number of subcarriers of this collection that are used by the NPP message (NPP subcarriers) can be fixed or variable, as further described below. In an embodiment, the data codewords and the NPP message being modulated in a given symbol time slot are modulated with respective subcarriers in opposite directions. For example, the NPP message can be modulated starting with the lowest frequency subcarrier of the collection of subcarriers (and moving up) and data symbols can be modulated starting with the highest frequency subcarrier (and moving down) of the collection of subcarriers, or vice versa. The modulation of the data codewords and the NPP message can be performed at the same time or one after the other (e.g., modulating a codeword then its respective NPP channel information, then another codeword; or modulating all the codewords then the NPP Message).

Multi-carrier modulated symbol 316 can then be acted upon by CP and Windowing module 322 before being forwarded to RF transmitter 334. RF transmitter 334 is configured to transmit multi-carrier modulated symbol 316 over a multi-carrier channel of coaxial cable 336 to at least one CM. As described above, the multi-carrier channel includes a plurality of data subcarriers configured to transport the data symbols; a plurality of PLC subcarriers configured to transport the PLC symbols; and NPP subcarriers configured to transport the NPP symbols. In an embodiment, the PLC symbols include a template of the multi-carrier channel, including at least one of: a center frequency of the multi-carrier channel, available subcarriers of the multi-carrier channel, frequency locations of the NPP subcarriers within the multi-carrier channel, a default modulation profile (e.g., profile A), synchronization information, and power management information. Assuming the data symbols include at least a first data codeword being transported by a first data subcarrier group of the plurality of data subcarriers, then the NPP symbols include a pointer configured to identify frequency and time boundaries of the first data subcarrier group and a modulation profile identifier associated with the first codeword (a codeword may expand one symbol).

As will be understood by a person of skill in the art based on the teachings herein, example PHY transmitter 300 can also be used to embed upstream PHY link signaling from one or more CM(s) to a network termination modem. In an embodiment, the upstream PHY link signaling can be allocated a dedicated number of subcarriers in the upstream. For example, in an OFDMA frame, which can include simultaneous transmissions on respective subcarrier groups from multiple CMs to the network termination modem, a set of subcarriers can be reserved for upstream PHY link signaling. The reserved set of subcarriers (in terms of number and frequency placement) can be fixed or may vary by the network termination modem. In each symbol time slot, only one CM can use the reserved set of subcarriers for upstream PHY link signaling to the network termination modem. In an embodiment, the network termination modem allocates transmission opportunities for upstream PHY link signaling to the CMs. In another embodiment, the CMs use a contention-based protocol to transmit on the set of subcarriers reserved for upstream PHY link signaling. In a further embodiment, some upstream messages may be unicast (use allocated transmission opportunities) and other messages may be broadcast (use contention-based access). In an embodiment, upstream PHY link signaling can include a CM identifier to identify the transmitting CM, initial ranging signaling (used for the network termination modem to determine the ranging information for the CM and to align the CM with other existing CMs on the same OFDMA frame), period Error Vector Magnitude (EVM) probes, power related messages, and error events, to name a few examples. In an embodiment, upstream PHY link signaling can be implemented in a similar fashion to the downstream PLC described above, e.g., with a preamble sequence for detection followed by data.

Figure 4:
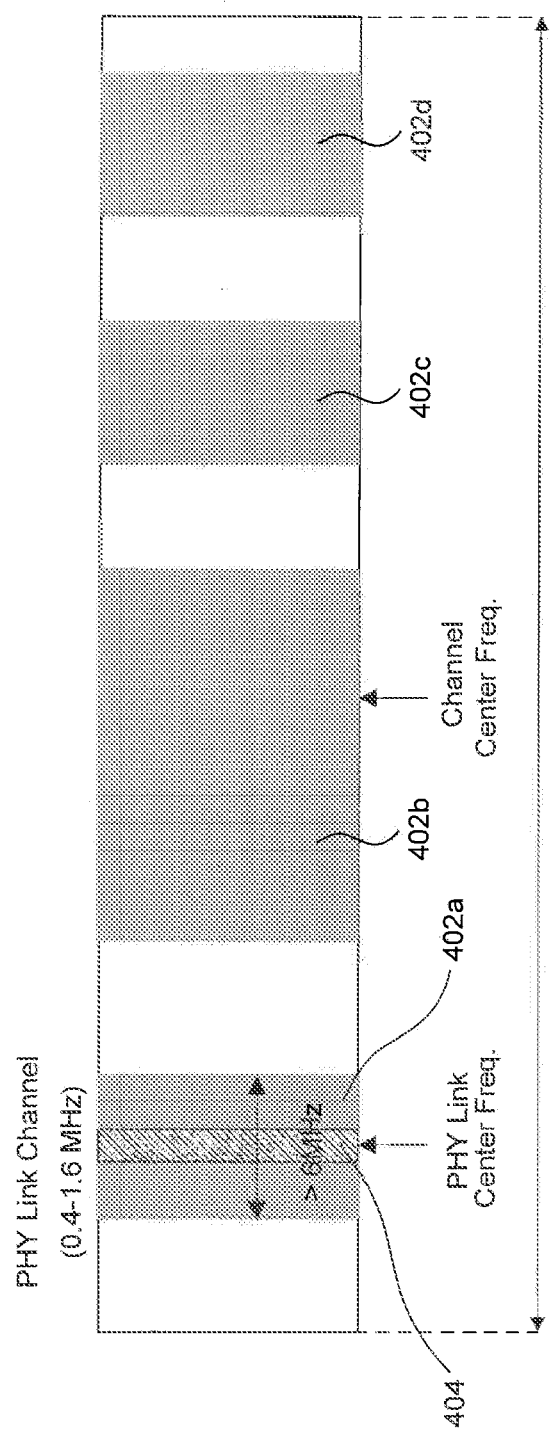
FIG. 4 is a frequency domain illustration of an example multi-carrier channel according to an embodiment.

FIG. 4 is a frequency domain illustration of an example multi-carrier channel 400 according to an embodiment. Example multi-carrier channel 400 is provided for the purpose of illustration only and is not limiting of embodiments. Example multi-carrier channel 400 can be generated and transmitted using a PHY transmitter, such as example PHY transmitter 300, for example. Specifically, example multi-carrier channel 400 can be a downstream channel transmitted from a network termination modem to one or more CM(s). In an embodiment, channel 400 can be an OFDM channel having a frequency bandwidth up to 192 MHz.

As shown in FIG. 4, multi-carrier channel 400 includes a plurality of subcarrier segments 402*a*, 402*b*, 402*c*, and 402*d*, which can be separated in frequency from each other by existing services, for example. Subcarrier segments 402*a*, 402*b*, 402*c*, and 402*d* can be of same or different sizes in terms of the subcarriers that each includes. In an embodiment, as shown in FIG. 4, a portion 404 of segment 402*a* is dedicated for transporting a PLC, as described above. In an embodiment, portion 404 can include between 8 and 32 subcarriers. In another embodiment, the PLC can be between 0.4 and 1.6 MHz in bandwidth. However, other bandwidth values can also be used for the PLC according to embodiments. In an embodiment, the center frequency of the PLC corresponds to a DOCSIS downstream center frequency as specified in the DOCSIS standard.

Figure 5:
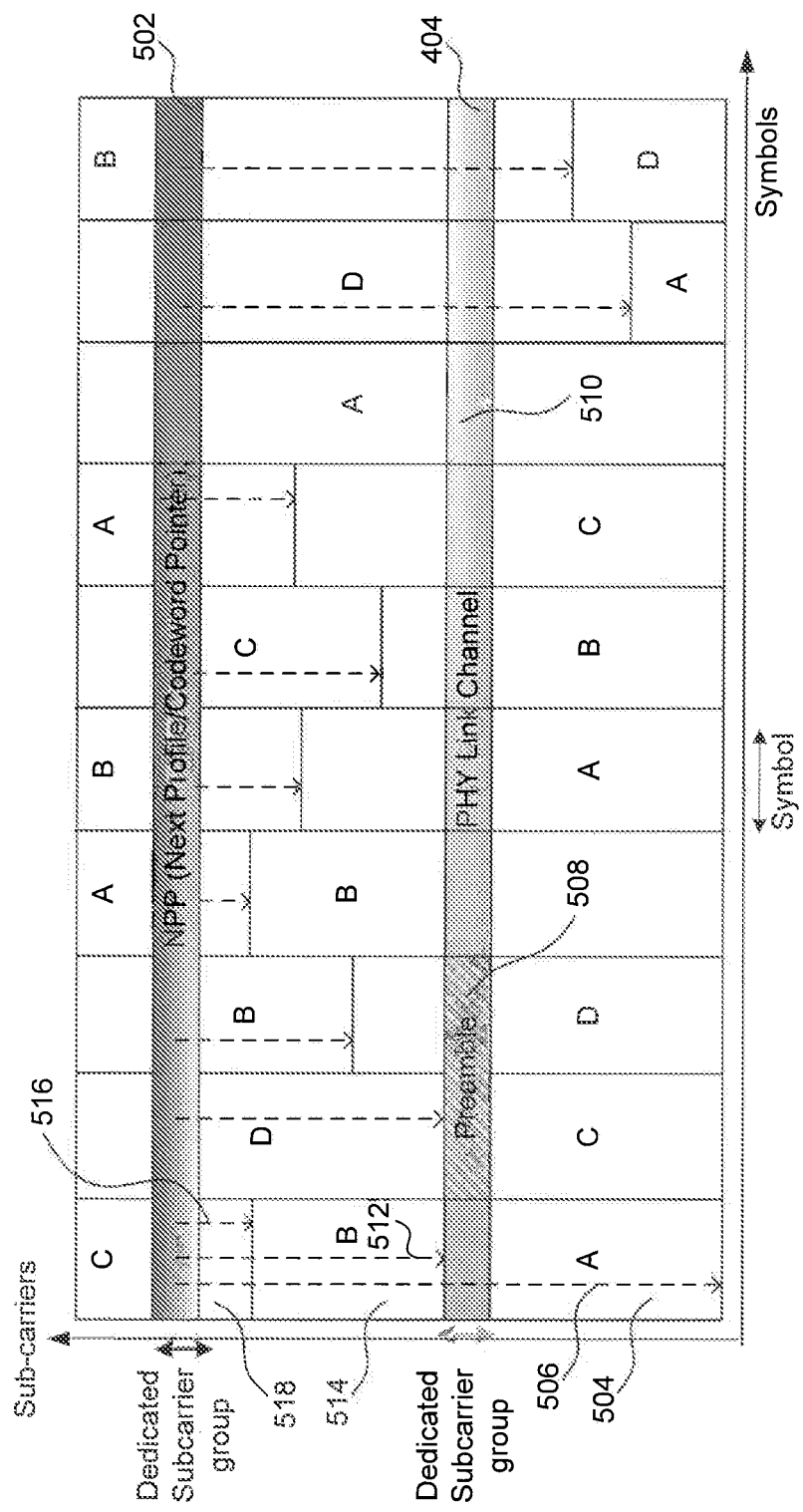
FIG. 5 is a time and frequency domain illustration of another example multi-carrier channel according to an embodiment.

FIG. 5 is a time and frequency domain illustration of another example multi-carrier channel 500 according to an embodiment. Example multi-carrier channel 500 is provided for the purpose of illustration only and is not limiting of embodiments. Example multi-carrier channel 500 can be generated and transmitted using a PHY transmitter, such as example PHY transmitter 300, for example. Specifically, example multi-carrier channel 500 can be a downstream channel transmitted from a network termination modem to one or more CM(s). It is noted that example multi-carrier channel 500 is shown before time and/or frequency interleaving has been performed on channel 500.

As shown in FIG. 5, in the frequency domain, example multi-carrier channel 500 includes a PLC 404 and a NPP channel 502, which are interleaved in frequency with data subcarrier segments. PLC 404 is transmitted continuously in time over the same dedicated subcarrier group (PLC subcarriers). Periodically, PLC 404 includes a preamble 508 that is inserted with PHY link up information 510. Preamble 508 can be used by a CM wishing to join the network to detect PLC 404. In an embodiment, preamble 508 occupies a fixed number of symbols (e.g., 8 symbols) (preamble 508 not shown according to scale in FIG. 5).

In an embodiment, PHY link up information 510 contains messages exchanged between the network termination modem and one or more CMs that are used by the CM(s) to perform read and write (get and set) operations that permit the CM to manage and monitor other operational aspects of a CM as well as other operational changes such as, but not limited to, directing a CM to change receiver frequency to a second downstream PLC channel and complete PHY Link up procedures on that second channel. In another embodiment, PHY link up information 510 contains a timing reference that is used by one or more CMs as part of maintaining precision shared clock synchronization with the network termination modem.

NPP channel 502 is transmitted on a dedicated subcarrier group (NPP subcarriers). In an embodiment, the NPP message occupies between 4 and 24 subcarriers in a symbol time slot per each NPP (or codeword). In another embodiment, the NPP message occupies a variable number of subcarriers in a symbol time slot, depending on the number of data codewords being transmitted in the symbol time slot. In other embodiments, as further described below in FIG. 7C, the NPP channel can occupy multiple frequency separated subcarrier groups. In an embodiment, the NPP message in a given symbol time slot includes pointers to the frequency boundaries (e.g., first subcarrier or last subcarrier) of subcarrier groups carrying data codewords in the symbol time slot. For example, in FIG. 5, in the first symbol time slot shown, the NPP message includes a first pointer 506 that identifies the first subcarrier frequency of a first subcarrier group carrying a codeword 504 (codeword A), a second pointer 512 that identifies the first subcarrier of a second subcarrier group carrying a codeword 514 (codeword B), and a third pointer 516 that identifies the first subcarrier of a third subcarrier group which carries a portion of a codeword 518 (codeword C) (codeword C begins in the first symbol time slot and ends in the second symbol time slot). A receiver can determine the codeword lengths of codewords by reading consecutive pointers from the NPP message.

In another embodiment, MAC Management Messages (MMM) can be transmitted on data subcarriers as part of the data (not shown in FIG. 5). MMM originate in upper layers (e.g., MAC) and can include additional profile information and/or OFDM specific information.

Figure 6:
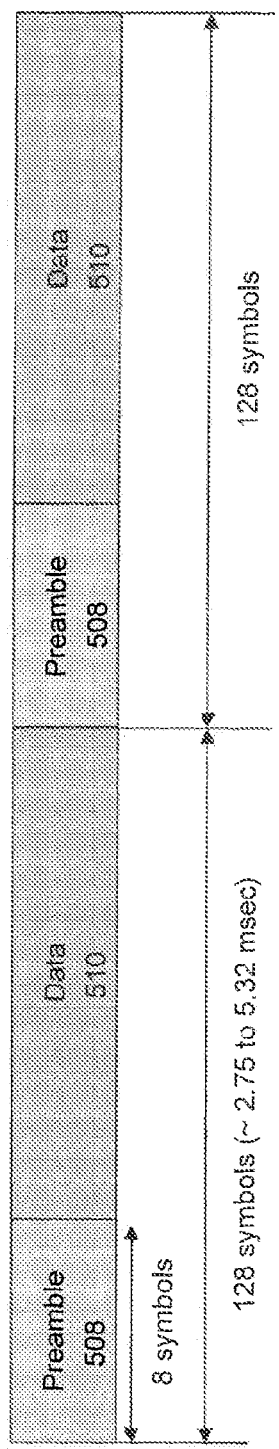
FIG. 6 is a time domain illustration of an example PHY Link Channel (PLC) according to an embodiment.

FIG. 6 is a time domain illustration of an example PLC 600 according to an embodiment. Example PLC 600 is provided for the purpose of illustration only and is not limiting of embodiments. As shown in FIG. 6, PLC 600 includes a preamble 508 and PHY link up information 510. In an embodiment, preamble 508 occupies 8 symbol time slots and repeats every 128 symbols.

Figure 7A:
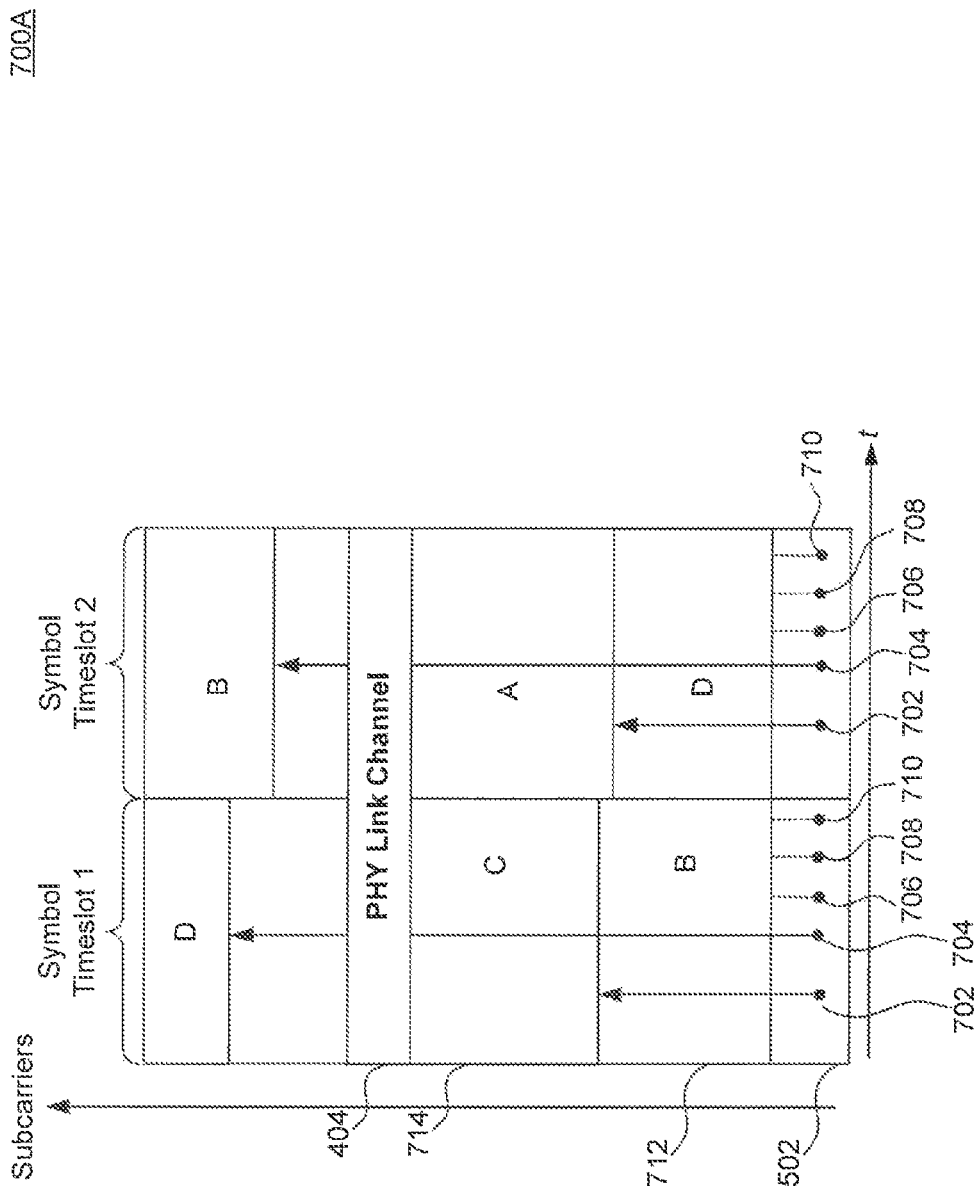
FIGS. 7A-7C illustrate example implementations of a Next Profile Pointer (NPP) channel according to embodiments.
Figure 7B:
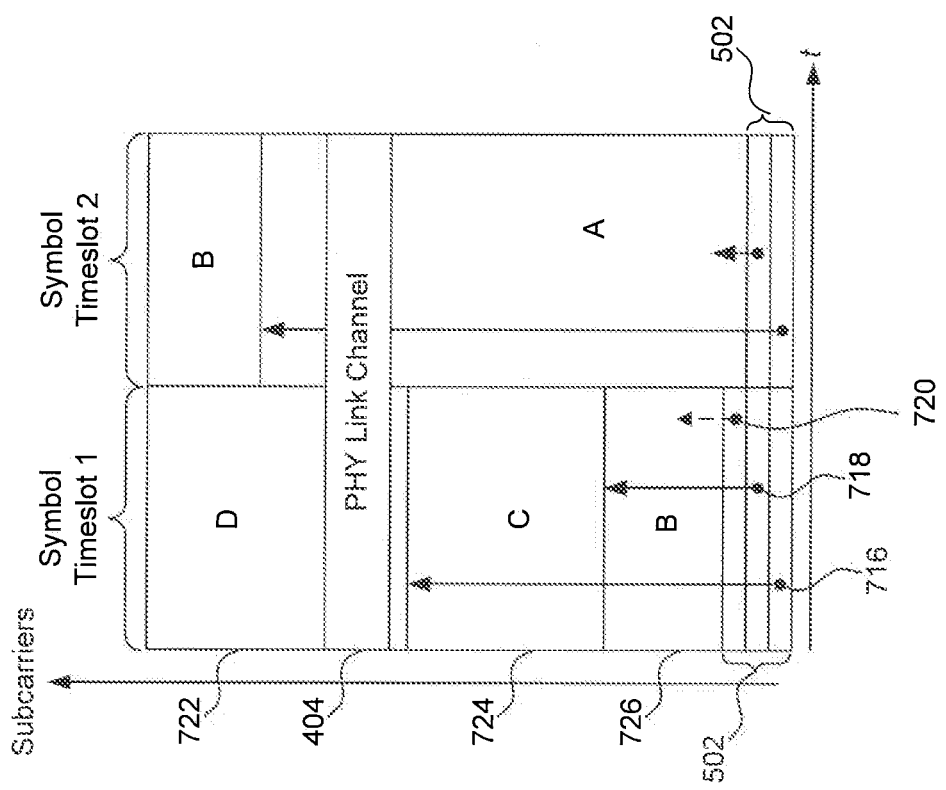
Figure 7C:
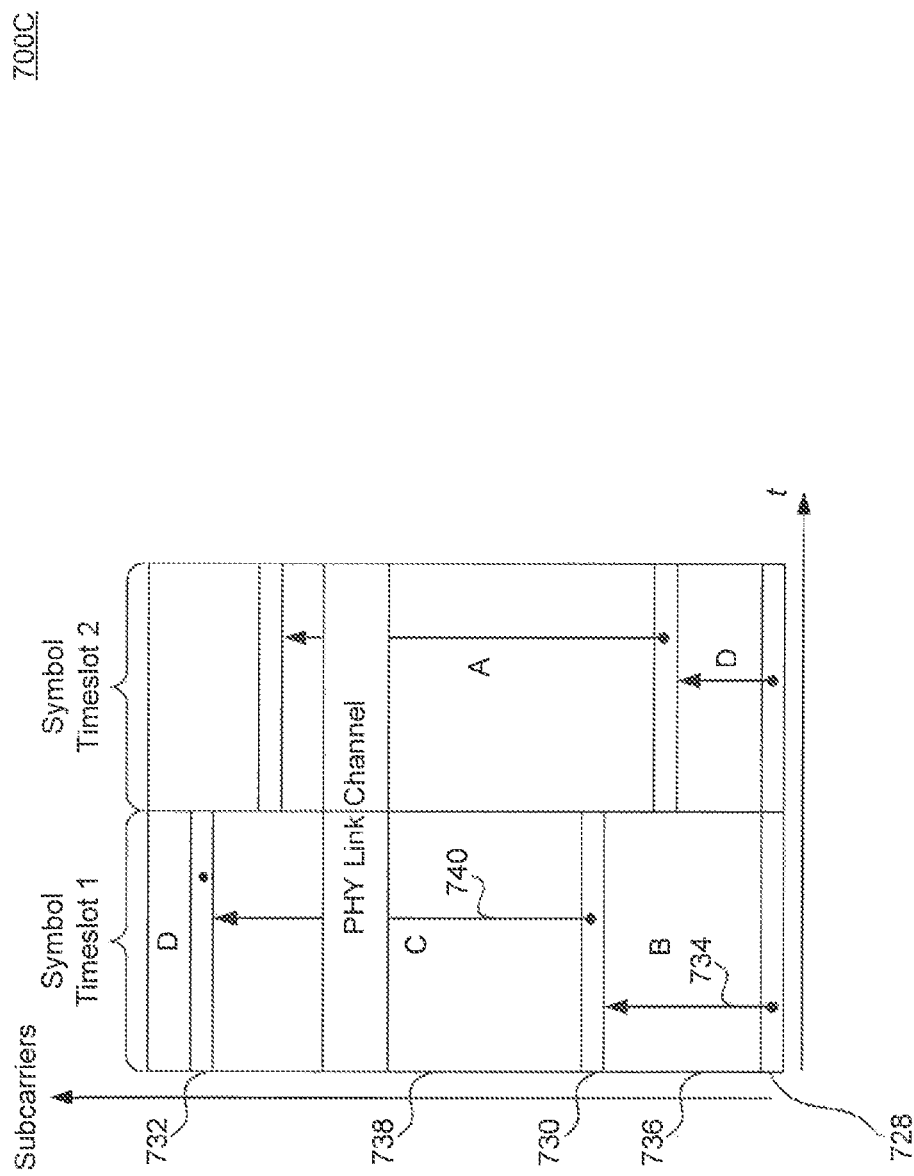

FIGS. 7A-7C illustrate example implementation 700A, 700B, and 700C of a Next Profile Pointer (NPP) channel according to embodiments. Example implementations 700A-C are provided for the purpose of illustration only and are not limiting of embodiments.

In example implementation 700A, NPP channel 502 is transmitted over a fixed (reserved) set of subcarriers in a given symbol time slot. Depending on the bandwidth of NPP channel 502, a fixed number of pointers (and associated modulation profile identifiers) can be transported in a given NPP message. For example, as shown in the embodiment of FIG. 7A, each NPP message of NPP channel 502 can include 5 pointers: 702, 704, 706, 708, and 710. As such, up to 5 codewords can be transported in a given symbol time slot.

In an embodiment, each pointer is configured to point to the last subcarrier of a subcarrier group carrying a respective codeword. In another embodiment, each pointer is configured to point to the first subcarrier of a subcarrier group and includes the length of the subcarrier group. For example, in the first symbol time slot, pointer 702 points to the last subcarrier of a subcarrier group 712 carrying a codeword B. Pointer 704 points to the last subcarrier of a subcarrier group 714 carrying a codeword C. However, because only two codewords end within the first symbol time slot, only two pointers (702 and 704) of the available 5 pointers are used in the first symbol time slot. Unused pointers 706, 708, and 710 are set to a NULL value.

In example implementation 700B, NPP channel 502 is transmitted over a variable set of subcarriers, which can vary from symbol time slot to another depending on the actual number of codewords carried in the symbol time slot. According to this implementation, the data codewords and the NPP message being transmitted in a given symbol time slot are mapped to subcarriers in opposite directions. For example, in an embodiment, the NPP message is mapped starting with the lowest frequency subcarrier (and moving up) and the data codewords are mapped starting with the highest frequency subcarrier (and moving down). For example, in the first symbol time slot, a data codeword D (codeword D) is first mapped to a first subcarrier group 722 that begins with the highest frequency subcarrier. Correspondingly, a pointer 716 that points to the last subcarrier (i.e., lowest frequency subcarrier) of first subcarrier group 722 is mapped to one or more subcarriers starting from the lowest frequency subcarrier. Alternatively, pointer 716 can point to the first subcarrier of first subcarrier group 722 and can include the length in number of subcarriers of first subcarrier group 722. Then, a codeword C is mapped to a second subcarrier group 724 and a corresponding pointer 718, which points to the last subcarrier of second subcarrier group 724, is mapped to one or more subcarriers above and adjacent to the ones used for pointer 716. Finally, a portion of a third codeword B is mapped to a third subcarrier group 726. Because third codeword B does not end in the first symbol time slot, a pointer 720 is mapped to one or more subcarriers above and adjacent the ones used for pointer 718. In an embodiment, pointer 720 is configured to point to third subcarrier group 726 (which is the last subcarrier group) to indicate end of pointer processing to a receiver.

In example implementation 700C, NPP channel 502 is transmitted over a variable set of subcarriers, which can vary from symbol time slot to another depending on the actual number of codewords carried in the symbol time slot. According to this implementation, in every symbol time slot, NPP channel 502 has a reserved subcarrier group 728, which points to the last subcarrier of the first data subcarrier group. For example, in the first symbol time slot, subcarrier group 728 is used to carry a pointer 734 that points to the last subcarrier of a first data subcarrier group 736. Then, if the symbol time slot includes additional codewords, additional subcarrier groups for corresponding pointers are added inline before the start of each codeword. For example, as shown in FIG. 7C, a subcarrier group 730 located immediately below a second data subcarrier group 738 is used to carry a pointer 740 for identifying the last subcarrier of second data subcarrier group 738. Finally, a subcarrier group 732 located above second data subcarrier group 738 carries a NULL pointer to indicate that the subsequent codeword does not terminate in the current symbol time slot.

It must be noted that although the above example implementations show the data codewords being mapped starting from the highest available subcarriers and the NPP channel being mapped starting from the lowest available subcarriers, in other implementation the data codewords and the NPP channel can be mapped in the reverse directions.

Figure 8:
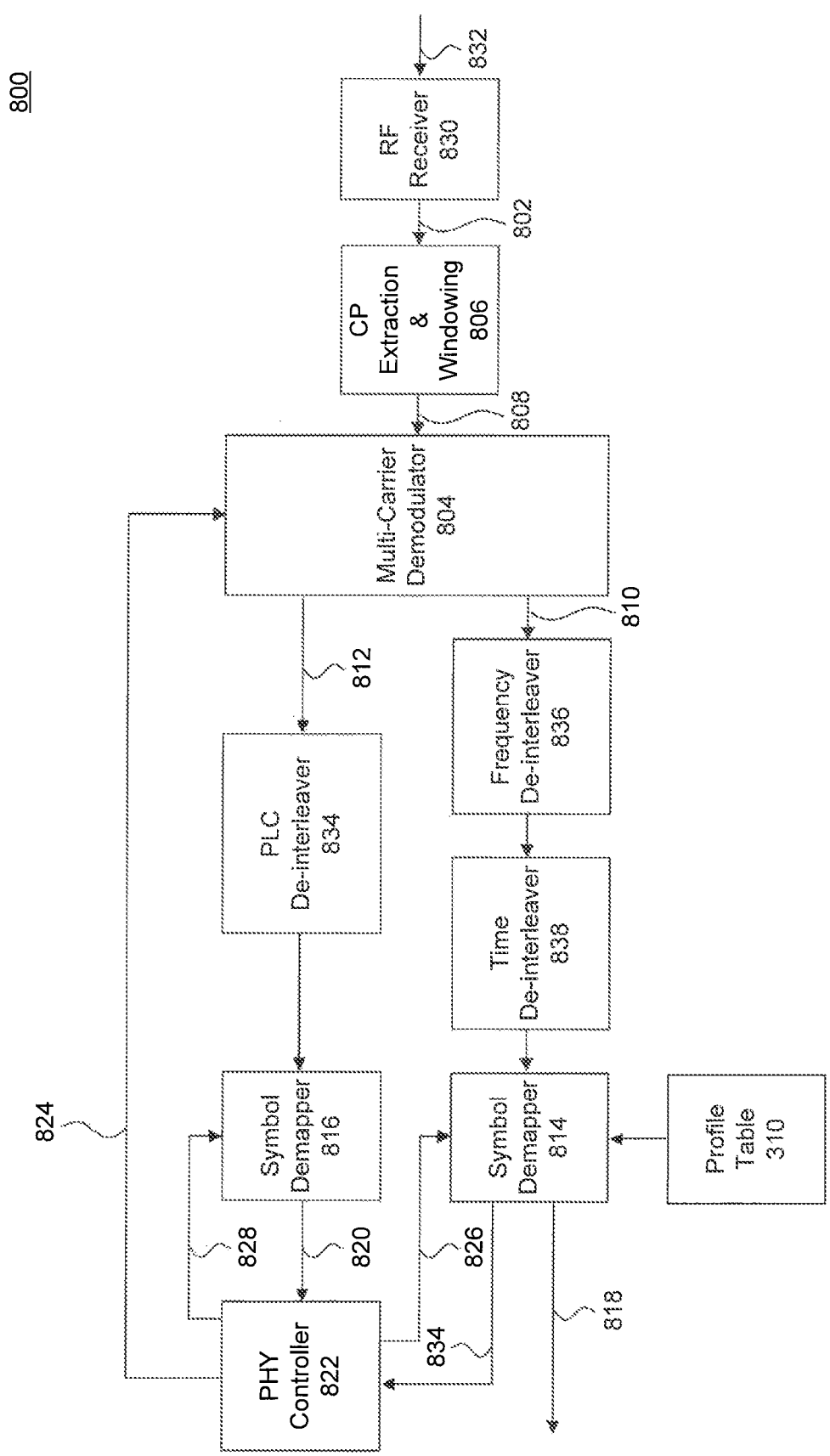
FIG. 8 illustrates an example PHY receiver according to an embodiment.

FIG. 8 illustrates an example PHY receiver 800 according to an embodiment. Example PHY receiver 800 is provided for the purpose of illustration only and is not limiting of embodiments. Example PHY receiver 800 can be located in a network termination modem, such as network termination modem 102, for example, or in a CM, such as CM 104. In the embodiment described below, PHY receiver 800 is described as being embedded in a CM and used to receive a multi-carrier modulated signal (comprising time consecutive multi-carrier modulated symbols, each symbol transmitted in a symbol time slot over a multi-carrier channel), carrying both data and PHY link signaling from a network termination modem. As will be understood by a person of skill in the art based on the teachings herein, PHY receiver 800 can also be used in a network termination modem to receive a multi-carrier modulated signal for carrying data and upstream PHY link signal upstream to the network termination modem.

As shown in FIG. 8, example PHY receiver 800 includes, among other components, an RF receiver 830; a Cyclic Prefix (CP) Extraction and Windowing module 806; a multi-carrier demodulator 804, which may including a Fast Fourier Transform (FFT) module; a PLC de-interleaver 834; a frequency de-interleaver 836; a time de-interleaver 839; symbol demappers 814 and 816, a profile table 310, and a PHY controller 822.

RF receiver 830 is configured to receive a multi-carrier channel over a coaxial cable 832 and generate a multi-carrier modulated signal 802. Signal 802 can include consecutive OFDM symbols, for example. As described above, the multi-carrier channel can include a plurality of data subcarriers configured to transport data symbols; and a plurality of PLC subcarriers configured to transport PLC symbols. The plurality of data subcarriers can also include NPP subcarriers configured to transport NPP symbols as described above. Signal 802 is acted upon by CP extraction and windowing module 806 to generate a multi-carrier modulated signal 808.

In an embodiment, multi-carrier demodulator 804 is configured to demodulate multi-carrier modulated signal 808, for example using a FFT module, to generate PLC symbols 812 and data (and NPP) symbols 810.

In an embodiment, PLC symbols 812 are demodulated from PLC subcarriers and can span one or more symbol time slots (e.g., 128 symbols as shown in FIG. 6). PLC symbols 812 are then time de-interleaved using PLC de-interleaver 834 and then demapped by symbol demapper 816 to generate a PHY link signaling bit stream 820, which is provided to PHY controller 822. In an embodiment, the location of the PLC subcarriers are known to PHY receiver 800. Accordingly, PHY controller 822 can configure demodulator 804 using a control signal 824 to demodulate the PLC subcarriers to generate PLC symbols 812. In another embodiment, PHY controller 822 configures symbol demapper 816 using a control signal 828 according to a modulation profile (e.g., 16-QAM) used to transmit the PLC.

PHY controller 822 is configured to identify a PHY Link Channel (PLC) in PHY link signaling bit stream 820. In an embodiment, PHY controller 822 is configured to detect a preamble embedded within the PLC. Upon detecting the preamble, PHY controller 822 can read and retrieve information from the PLC. In an embodiment, to detect the preamble, PHY controller 822 is configured to control multi-carrier demodulator 804 to perform a two-dimensional search for FFT size and Cyclic Prefix (CP) size. The search can include testing a number of hypotheses until a hypothesis resulting with a maximum correlation is found. Subsequently, PHY controller 822 can perform another search to determine a frequency offset between the CM and the network termination modem. This search can also include testing a number of frequency offset hypotheses between the preamble sequence embedded in the PLC and a local replica stored in PHY receiver 800. Once the FFT size, CP size, and frequency offset are determined, PHY controller 822 can find the preamble embedded in the PLC and can use the preamble to estimate the downstream channel from the network termination modem. After estimating the channel, PHY controller 822 can begin receiving and reading the data portion of the PLC.

In an embodiment, PHY controller 822 is configured to retrieve a template of the multi-carrier channel from the PLC, the template including at least one of: a center frequency of the multi-carrier channel, available subcarriers of the multi-carrier channel, frequency locations of the NPP subcarriers within the multi-carrier channel, a default modulation profile, synchronization information, and power management information.

Data (and NPP) symbols 810 are provided to frequency de-interleaver 836, which performs frequency de-interleaving on the symbols, and then to time de-interleaver 828, which performs time de-interleaving on the symbols, before being provided to symbol demapper 814. Data (and NPP) symbols 810 can span one or more symbol time slots. The description below presents the processing of data and (NPP) symbols 810 over a single symbol time slot.

Symbol demapper 814 acts on data (and NPP) symbols 810 to generate a data bit stream 818 and an NPP bit stream 834. In an embodiment, PHY controller 822 configures symbol demapper 814 to separate data bit stream 818 from NPP bit stream 834 when demapping data (and NPP) symbols 810. In an embodiment, PHY controller 822 uses information obtained from the PLC to separate the two bit streams.

In an embodiment, in each symbol time slot, NPP bit stream 834 includes a single NPP message. The NPP message, as described above, include pointers (and modulation profile identifies) for data codewords being transported or started within the same symbol time slot on the data subcarriers. In an embodiment, PHY controller 822 reads the NPP message to identify at least a first codeword being transported by a first data subcarrier group of the plurality of data subcarriers. For example, PHY controller 822 can retrieve a pointer configured to identify a boundary of the first data subcarrier group and a modulation profile associated with the first codeword.

In an embodiment, if the modulation profile associated with the first codeword matches a profile of the CM (where PHY controller 822 resides), PHY controller 822 configures symbol demapper 814 to demap the data symbols corresponding to the first data subcarrier group to generate the first codeword as part of data bit stream 818. Specifically, PHY controller 822 configures symbol demapper 814, using a control signal 826, to de-map the first codeword data symbols using the modulation profile (read in the NPP message) to generate the bits for the first codeword. Data bit stream 818 is then forwarded for further processing (e.g., FEC decoding, de-interleaving, etc.) before being forwarded as one or more MAC frames to the MAC layer.

In accordance with the above teachings, embodiments also include a cable network having a network termination modem, at least one CM, and a coaxial distribution network that connects the network termination modem to the at least one CM. The network termination modem can be configured to transmit a multi-carrier modulated signal over a multi-carrier channel of the coaxial distribution network to the at least one CM. The multi-carrier modulated signal can comprise at least one data codeword destined to the at least one CM, a PLC including a template of the multi-carrier channel, and a NPP channel identifying frequency and time boundaries of the at least one data codeword within the multi-carrier channel. The at least one CM can be configured to find the PLC within the multi-carrier modulated signal; determine, using the PLC, a frequency location of the NPP channel and other transmission characteristics required to receive the signal; retrieve the frequency and time boundaries of the at least one codeword from the MT channel; and retrieve the at least one codeword from the multi-carrier modulated signal based on the frequency boundary.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description, and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A network termination modem, comprising:
   a physical layer (PHY) controller configured to generate a Next Profile Pointer (NPP) bit stream;
   at least one symbol mapper configured to receive a data bit stream and the NPP bit stream, and to map the data bit stream and the NPP bit stream to respective constellations to generate data symbols and at least one NPP symbol; and
   a multi-carrier modulator configured to modulate the data symbols and the at least one NPP symbol with respective subcarriers to generate a multi-carrier modulated symbol.

2. The network termination modem of claim 1, wherein the data symbols include at least a first codeword, the first codeword being transported by a first data subcarrier group of a plurality of data subcarriers.

3. The network termination modem of claim 2, wherein the at least one NPP symbol includes a pointer configured to identify a frequency boundary of the first data subcarrier group.

4. The network termination modem of claim 2, wherein the at least one NPP symbol includes a modulation profile identifier associated with the first codeword.

5. The network termination modem of claim 1, further comprising:
   a radio frequency (RF) transmitter configured to transmit the multi-carrier modulated symbol over a multi-carrier channel to at least one cable modem (CM), wherein the multi-carrier channel comprises:
   a plurality of data subcarriers configured to transport the data symbols; and
   at least one NPP subcarrier configured to transport the at least one NPP symbol.

6. The network termination modem of claim 5,
   wherein the PHY controller is further configured to generate a PHY link signaling bit stream;
   wherein the at least one symbol mapper is further configured to receive the PHY link signaling bit stream, and to map the PHY link signaling bit stream to a constellation to generate PHY Link Channel (PLC) symbols;
   wherein the multi-carrier modulator is further configured to modulate the PLC symbols onto a plurality of PLC subcarriers; and
   wherein the multi-carrier channel further comprises the plurality of PLC subcarriers.

7. The network termination modem of claim 6, wherein the PLC symbols include a frequency location of the at least one NPP subcarrier within the multi-carrier channel.

8. The network termination modem of claim 6, wherein the PLC symbols include a power management message.

9. The network termination modem of claim 8, wherein the power management message indicates the transmission of codewords intended for reception by a CM operating in a sleep mode.

10. The network termination modem of claim 5, further comprising:
    an interleaver configured to interleave the data symbols and the NPP symbols; and
    a PLC interleaver dedicated to interleave the PLC symbols.

11. A cable modem (CM), comprising:
    a multi-carrier demodulator configured to demodulate a multi-carrier modulated signal to generate Next Profile Pointer (NPP) symbols;
    at least one symbol demapper configured to de-map the NPP symbols to generate an NPP bit stream; and
    a physical layer (PHY) controller configured to identify an NPP channel in the NPP bit stream and to configure the multi-carrier demodulator based at least in part on information retrieved from the NPP channel.

12. The CM of claim 11, wherein the multi-carrier modulated signal comprises a plurality of data subcarriers configured to transport data symbols and at least one NPP subcarrier configured to transport the NPP symbols.

13. The CM of claim 12, wherein the data symbols include at least a first codeword, the first codeword being transported by a first data subcarrier group of the plurality of data subcarriers, and wherein the PHY controller is further configured to retrieve, from the NPP symbols, a pointer configured to identify a frequency and time boundary of the first data subcarrier group.

14. A method of modulating information onto a multi-carrier waveform, comprising:
    modulating data symbols on a first plurality of subcarriers of the multi-carrier waveform;
    modulating Next Profile Pointer (NPP) symbols on a second plurality of subcarriers of the multi-carrier waveform; and
    transmitting, using a radio frequency (RF) transmitter, the multi-carrier waveform over a physical communication medium,
    wherein the NPP symbols include a pointer to at least one subcarrier in the first plurality of subcarriers.

15. The method of claim 14, wherein the second plurality of subcarriers is contiguous within the multi-carrier waveform.

16. The method of claim 14, wherein the data symbols include at least a first codeword, the first codeword modulated on a first subcarrier group of the first plurality of subcarriers.

17. The method of claim 16, wherein the NPP symbols include a pointer to a first subcarrier of the first subcarrier group.

18. The method of claim 16, wherein the NPP symbols include a length of the first subcarrier group.

19. The method of claim 16, wherein the first subcarrier group is preceded by a first NPP symbol, and wherein the first subcarrier group is followed by a second NPP symbol.

20. The method of claim 14, further comprising:
 interleaving the first and second plurality of subcarriers.

* * * * *